(12) United States Patent
Hsu et al.

(10) Patent No.: US 10,375,712 B2
(45) Date of Patent: Aug. 6, 2019

(54) METHOD OF HANDLING NORMAL BANDWIDTH AND NARROW BANDWIDTH COEXISTENCE

(71) Applicant: MEDIATEK INC., Hsin-Chu (TW)

(72) Inventors: Tsai-Yuan Hsu, Hsinchu County (TW); Chieh-Chao Liu, Hsinchu County (TW); Shih-Chung Yin, Hsinchu (TW); Kun-Chien Hung, Hsinchu County (TW); Ching-Yu Kuo, Hsinchu (TW); Hung-Pin Ma, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 129 days.

(21) Appl. No.: 15/391,779

(22) Filed: Dec. 27, 2016

(65) Prior Publication Data

US 2017/0188380 A1 Jun. 29, 2017

Related U.S. Application Data (60) Provisional application No. 62/272,028, filed on Dec. 28, 2015.

(51) Int. Cl.
*H04W 72/12* (2009.01)
*H04W 74/08* (2009.01)

(52) U.S. Cl.
CPC ....... *H04W 72/1215* (2013.01); *H04W 74/08* (2013.01)

(58) Field of Classification Search
CPC . H04W 72/1215; H04W 74/08; H04W 36/16; H04W 76/27; H04W 76/38; H04W 4/005; H04W 4/14; H04W 36/14; H04W 76/068; H04W 36/165; H04W 68/005; H04W 72/042; H04W 76/046; H04W 72/04; H04W 76/02; H04W 4/20; H04W 76/10; H04W 4/70; H04W 24/04; H04W 36/20; H04W 74/0816; H04W 7/0452; H04W 52/02; H04W 52/0206; H04W 52/322; H04W 72/10; H04W 12/06; H04W 74/002; H04J 3/16; H04L 12/28; H04L 12/56; H04L 12/26; H04L 43/0829; H04L 5/0073; H04L 29/06; H04L 29/08; H04L 63/0428; H04L 67/1046; H04Q 3/66; H04Q 7/20; H04Q 7/28; H04B 7/0452; H04B 7/04
See application file for complete search history.

(56) References Cited

U.S. PATENT DOCUMENTS

| | | | |
|---|---|---|---|
| 2006/0126558 A1* | 6/2006 | Lee | H04W 36/14 370/329 |
| 2008/0080553 A1* | 4/2008 | Hasty | H04L 1/0002 370/468 |
| 2013/0188567 A1* | 7/2013 | Wang | H04L 5/0094 370/329 |

(Continued)

*Primary Examiner* — Hardikkumar D Patel
(74) *Attorney, Agent, or Firm* — Winston Hsu (57) ABSTRACT

A time-division mechanism that a source station uses a proprietary frame for notifying switching from a normal bandwidth operation to a narrow bandwidth operation to at least one destination station in a wireless communication system, and uses a protection frame to reserve the service period for the narrow bandwidth operation without the interference from the normal bandwidth operation, wherein the service period of the narrow bandwidth operation is indicated in the protection frame.

12 Claims, 8 Drawing Sheets

(56) References Cited

U.S. PATENT DOCUMENTS

2016/0007247 A1* 1/2016 Lee .................. H04W 36/0066
370/331
2018/0124670 A1* 5/2018 Alanen ............... H04W 74/002

* cited by examiner

METHOD OF HANDLING NORMAL BANDWIDTH AND NARROW BANDWIDTH COEXISTENCE

CROSS REFERENCE TO RELATED APPLICATIONS

This application claims the benefit of U.S. Provisional Application No. 62/272,028, filed on Dec. 28, 2015, the contents of which are incorporated herein.

BACKGROUND

IEEE 802.11 standards specify communication protocols for implementing wireless local area network (WLAN) communication between user equipments such as mobile phones, tablet computers and laptop computers, and network equipment such as access points. IEEE 802.11j standard introduces narrow bandwidth (e.g., 5 or 10 Mhz bandwidth) operation, or 802.11h standard also introduces narrow bandwidth (e.g., 1 Mhz bandwidth) operation, to achieve long range transmission up to 6 dB gain difference compared with popular 802.11 11b/g/n/ac standards using normal bandwidth (e.g., 20, 40, 80, or 160 Mhz).

In practice, during normal bandwidth operation, the network equipment may lose communication with the user equipment when the signal strength of the user equipment becomes weak because the user equipment has moved out of the signal coverage range of the normal bandwidth operation, or high packet error rate (PER) is detected due to packet collisions. Since the narrow bandwidth operation can achieve long range transmission up to 6 dB gain difference compared to the normal bandwidth operation, it is feasible to restore the communication between the network equipment and the user equipment by the narrow bandwidth operation.

However, there is no coexistence mechanism for narrow and normal bandwidth operations to allow station devices including user equipment and network equipment supporting both the narrow and normal bandwidths to communicate with each other using either narrow or normal bandwidth operation.

SUMMARY

It is therefore an objective of the present invention to provide a method of handling coexistence of different bandwidth operations for station devices in a wireless communication system.

The present invention utilizes time-division mechanism that a source station transmits a proprietary frame for notifying switching to narrow bandwidth operation to a destination station when a signal strength of the destination station become weak or a high packet error rate (PER) is detected in the wireless communication system.

For multiple solicitations, the source station (e.g., access point) broadcasts the proprietary frame, and further transmits a protection frame to at least one destination station (e.g., user equipment) in order to keep other stations performing normal bandwidth operation in silence, which protects the narrow bandwidth operation from interference due to the normal bandwidth operation, wherein a service period of the narrow bandwidth operation is indicated in the protection frame. Therefore, a period of time is reserved from the normal bandwidth operation to be utilized for the narrow bandwidth operation, and the destination station can communicate with the source station through the narrow bandwidth operation with better signal strength and PER.

For single solicitation, the source station transmits a proprietary request frame for inviting a destination station of interest to join a narrow bandwidth operation when the signal strength of the destination station become weak or a high packet error rate (PER) is detected in the wireless communication system, wherein a service period of the narrow bandwidth operation is indicated in the proprietary request frame. The destination station of interest transmits a proprietary response frame corresponding to the proprietary request frame to the source station to join the narrow bandwidth operation. The source station is regarded as an initiator of the narrow bandwidth operation, which can be either an access point or a user equipment. The destination station is regarded as a joiner of the narrow bandwidth operation, which can be either the user equipment or the access point. Therefore, a period of time is reserved from the normal bandwidth operation to be utilized for the narrow bandwidth operation, and the destination station can communicate with the source station through the narrow bandwidth operation with better signal strength and PER.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
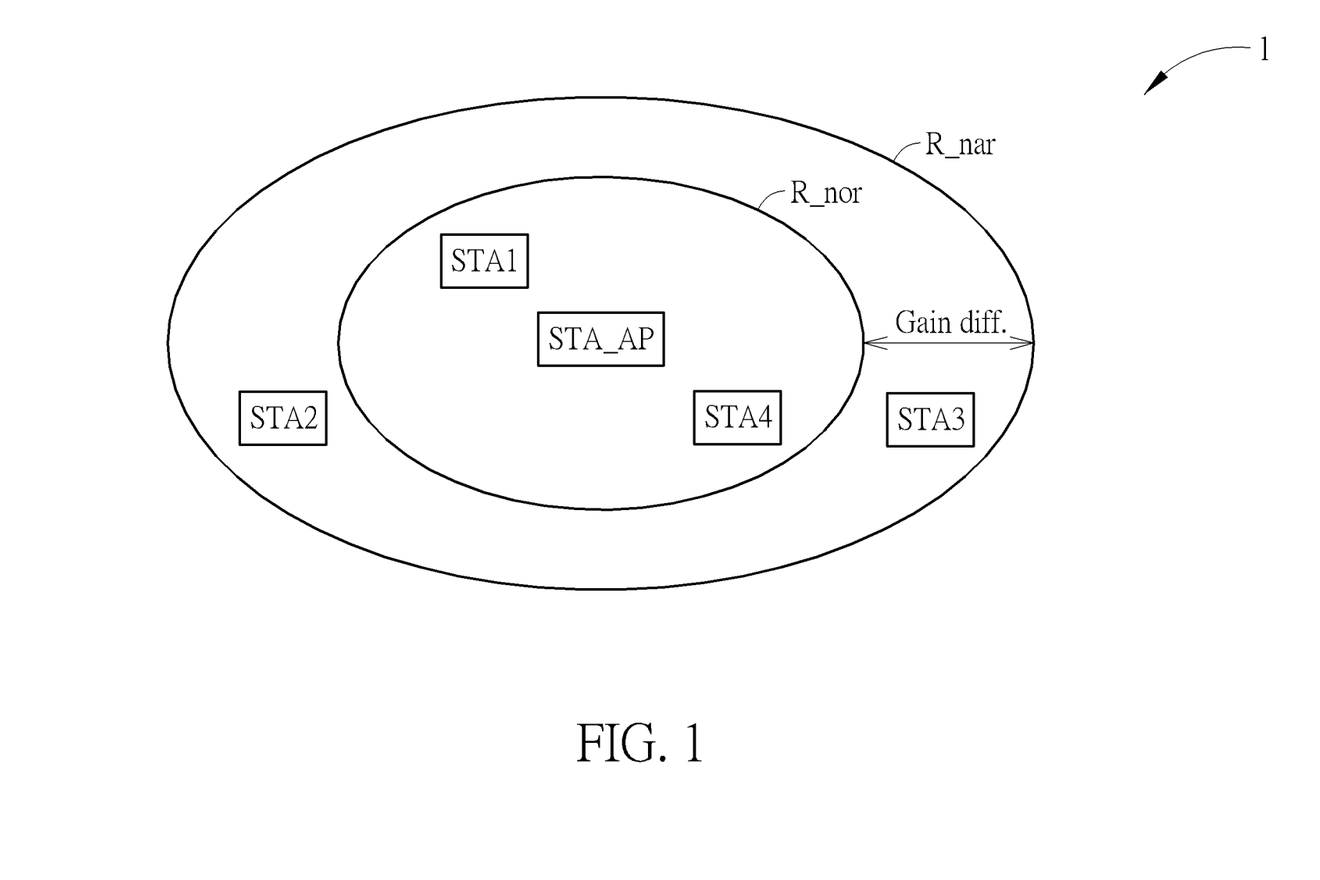
FIG. 1 illustrates a wireless communication system according to an embodiment of the present invention.

FIG. 1 illustrates a wireless communication system 1 according to an embodiment of the present invention. The wireless communication system 1 includes a station STA_AP and stations STA1-STA4. The station STA_AP plays a role of wireless access point (WAP) to provide accesses to a wireless local area network (WLAN) to the stations STA1-STA4. The STA_AP can also be a station operating in a soft access point (Soft AP) mode. The stations STA1-STA4 can be user equipments, such mobile phones, tablet computers, and any wireless communication capable devices. The station STA_AP and the stations STA1-STA4 can be compliant with IEEE 802.11a/b/g/n/ac or any similar standards to perform wireless communication using normal bandwidths, e.g., 20, 40, 80, and 160 MHz. The station STA_AP and the stations STA1 and STA2 are further compliant with IEEE 802.11j standard to perform wireless communication using narrow bandwidths, e.g., 5 MHz and 10 MHz. In an embodiment, the station STA_AP and the stations STA1 and STA2 are compliant with IEEE 802.11h standard to perform wireless communication using 1 MHz narrow bandwidth. In other words, the stations STA1 and STA2 support both normal and narrow bandwidth operations, and the stations STA3 and STA4 support only the normal bandwidth operation.

The station STA_AP provides two signal coverage ranges R_nor and R_nar for normal and narrow bandwidths, wherein the signal coverage range for narrow bandwidth is greater than the signal coverage range for normal bandwidth. This is because a frequency response or a gain-bandwidth product of an operational amplifier of the station STA_AP provides higher amplification gain when the bandwidth is relatively narrow, while a lower amplification gain is provided when the bandwidth is relatively wide. For example, an amplification gain difference between 5 MHz and 20 MHz bandwidths may be up to 6 dB.

Power save multi-poll (PSMP) operation is specified in IEEE 802.11n, which makes the station STA_AP to send notifications (action frames) to one or more of the PSMP capable stations STA1-STA4 during its transmit opportunity (TXOP), to allow the stations STA1-STA4 to transmit frames to the station STA_AP at specific points in time, or understand that the stations STA1-STA4 should be awake and ready to receive one or more transmissions at a specific point in time.

Figure 2:
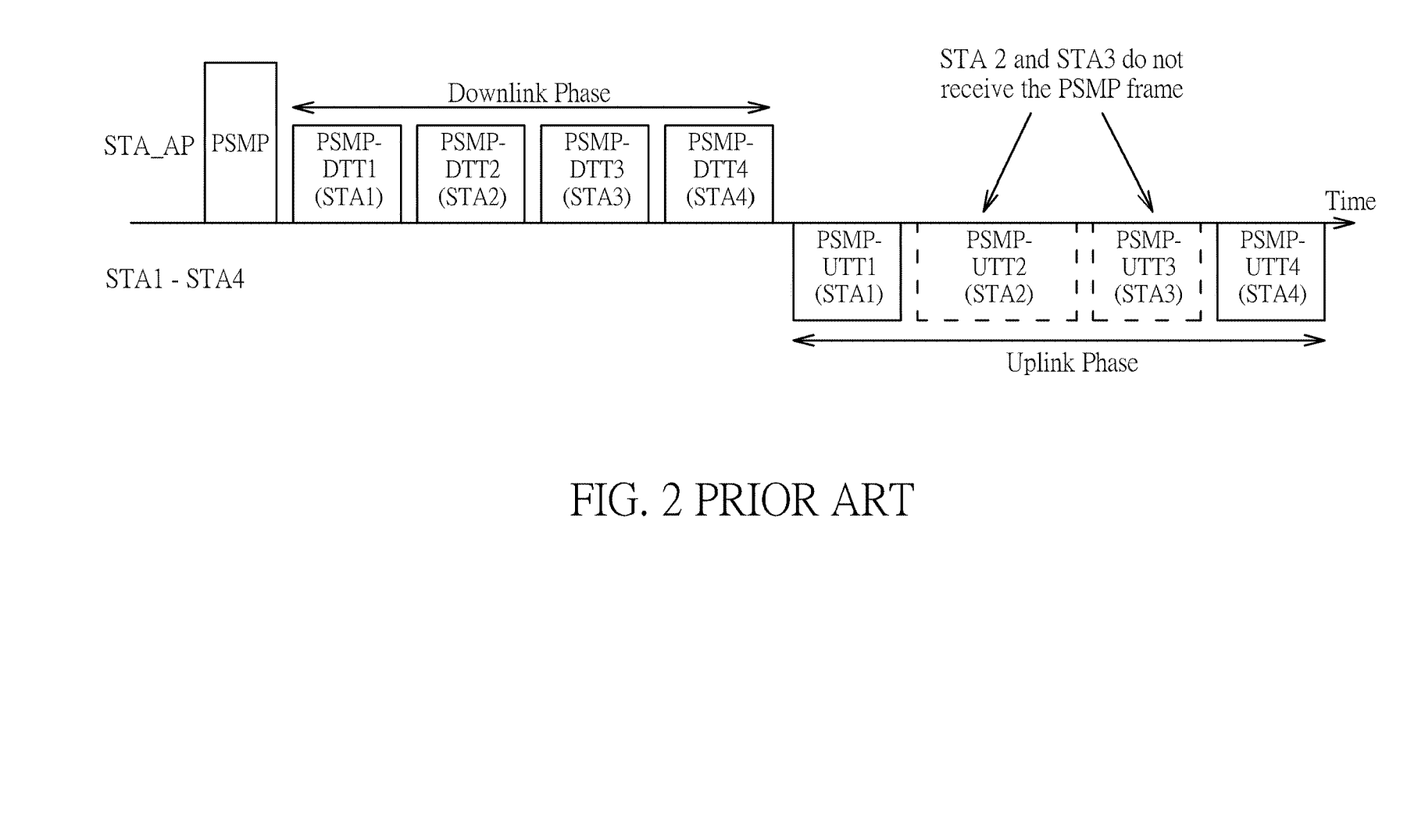
FIG. 2 illustrates a PSMP operation time slot configured for the stations in FIG. 1.

FIG. 2 illustrates a PSMP operation time slot configured for the stations STA1-STA4 by the station STA_AP (i.e., access point). Given that all the stations STA1-STA4 were located in the signal coverage ranges R_nor and performed wireless communication with the station STA_AP by the normal bandwidth operation. And later, the stations STA_1 and STA4 stay in the normal bandwidth coverage range R_nor, but the stations STA_2 and STA3 move to the narrow bandwidth coverage range R_nar to be out of the normal bandwidth coverage range R_nor.

In such a situation, in FIG. 2, the station STA_AP respectively configures PSMP-DTT (downlink transmission time, DTT) for the stations STA1-STA4 during a downlink phase/period, which are PSMP-DTT1, PSMP-DTT2, PSMP-DTT3 and PSMP-DTT4. Therefore, the stations STA1-STA4 are respectively configured with PSMP-UTT (uplink transmission time, DTT) during an uplink phase/period to transmit response packets and frames to the station STA_AP, which are PSMP-UTT1, PSMP-UTT2, PSMP-UTT3 and PSMP-UTT4. However, due to the stations STA_2 and STA3 have moved out of the normal bandwidth coverage range R_nor during the downlink phase/period, the station STA_AP does not detect response packets and frames from the stations STA_2 and STA3 during the PSMP-DTT2 and PSMP-DTT3 (i.e., high packet error rate (PER) may be detected), and the signal strength of the stations STA_2 and STA3 become weak. The station STA_AP may lose communication with the stations STA_2 and STA3.

Note that the station STA_2 supports both the narrow and normal bandwidth operations and is located in the narrow bandwidth coverage range R_nar, so the station STA_AP may restore communication with the station STA_2 by switching from the normal bandwidth operation to the narrow bandwidth operation.

Specifically, for a scenario of multiple solicitations, the station STA_AP may activate a bandwidth switch operation during the normal bandwidth operation to create or reserve a service period for narrow bandwidth operation if detecting signal strength of destination stations become weak or high PER, thereby restoring the communication with the destination station which supports narrow bandwidth operation, i.e., the station STA_2.

Figure 3:
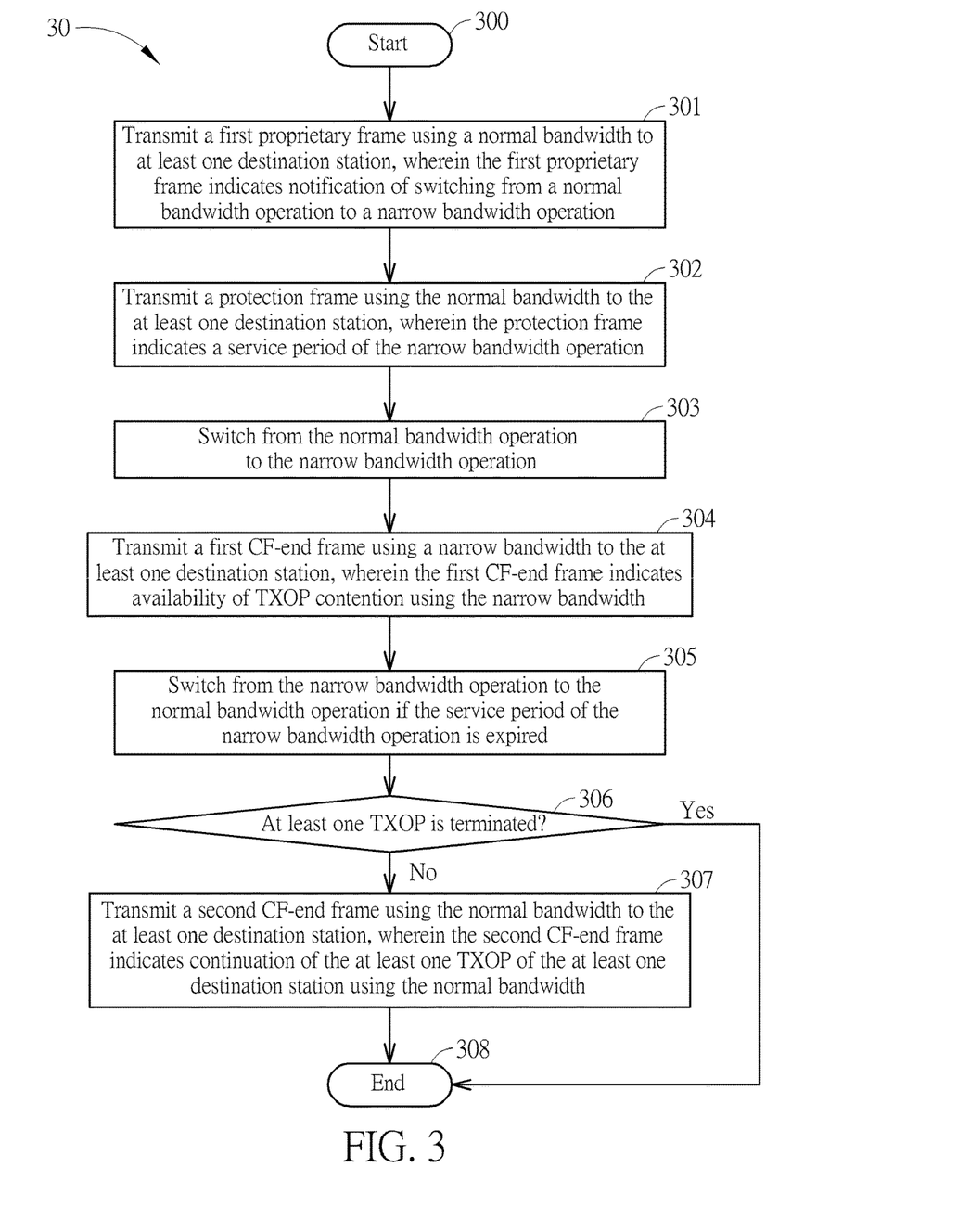
FIG. 3 is a flowchart of a process of performing normal bandwidth and narrow bandwidth coexistence operation for the source station in the wireless communication system in FIG. 1.

FIG. 3 is a flowchart of a process 30 of performing normal bandwidth and narrow bandwidth coexistence operation for the station STA_AP in the wireless communication system 1. The process 30 may be compiled into a program code and stored in a memory device of the station STA_AP to be executed by a wireless signal processing device of the station STA_AP. The process 30 includes the following steps.

Step 300: Start.
Step 301: Transmit a first proprietary frame using a normal bandwidth to at least one destination station, wherein the first proprietary frame indicates notification of switching from a normal bandwidth operation to a narrow bandwidth operation.
Step 302: Transmit a protection frame using the normal bandwidth to the at least one destination station, wherein the protection frame indicates a service period of the narrow bandwidth operation.
Step 303: Switch from the normal bandwidth operation to the narrow bandwidth operation.
Step 304: Transmit a first contention-free end (CF-end) frame using a narrow bandwidth to the at least one destination station, wherein the first CF-end frame indicates availability of TXOP contention using the narrow bandwidth.
Step 305: Switch from the narrow bandwidth operation to the normal bandwidth operation if the service period of the narrow bandwidth operation is expired.
Step 306: Check if at least one TXOP of the at least one destination station is terminated? Go to Step 308 if yes; go to Step 307 if no.
Step 307: Transmit a second CF-end frame using the normal bandwidth to the at least one destination station, wherein the second CF-end frame indicates continuation of the at least one TXOP of the at least one destination station using the normal bandwidth.
Step 308: End.

According to the process 30, the source station transmits the first proprietary frame for notification of switching from a normal bandwidth operation to a narrow bandwidth operation (Step 301). The source station transmits a protection frame to reserve a service period of the narrow bandwidth operation (Step 302), wherein the protection frame may be a clear-to-send to itself (CTS-self) frame for indicating the service period of the narrow bandwidth operation. Then, the source station switches from the normal bandwidth operation to the narrow bandwidth operation (Step 303), and transmits a first CF-end frame to the at least one destination station after the narrow bandwidth operation switch is completed (Step 304), wherein the first CF-end frame indicates availability of TXOP contention. Therefore, the destination station supporting the narrow bandwidth operation may contend TXOP to obtain uplink and downlink transmissions using the narrow bandwidth. The source station switches from the narrow bandwidth operation to the normal bandwidth operation if the service period of the narrow bandwidth operation is expired (Step 305). The source station checks whether the TXOP of the destination station during the narrow bandwidth operation is terminated or not (Step 306). If not terminated, the source station transmits a second CF-end frame using normal bandwidth to the destination station for indicating continuation of the TXOP using normal bandwidth (Step 307), which allows the destination station to continue the TXOP using normal bandwidth.

As a result, for the case of multiple solicitations, with the process 30, the source station may initiate the bandwidth switch operation during the normal bandwidth operation to create or reserve the service period for narrow bandwidth operation, thereby restoring the communication with the destination station which is out of the normal bandwidth coverage range through the narrow bandwidth operation.

In one embodiment, the first proprietary frame may be named as "narrow bandwidth switch" frame. In one embodiment, the service period of the narrow bandwidth operation may be indicated by a Net Allocation Vector (NAV) timer of the protection frame or the CTS-self frame or the PSMP schedule frame. In one embodiment, the source station may indicate a capability of the narrow bandwidth operation in at least one of a beacon, probe request, probe response, association request, and association response frames.

In one embodiment, for regular normal bandwidth operation, the source station transmits frames using a standard transmission power level. In preparation of the narrow bandwidth operation, the source station increases its transmission power level to transmit the first proprietary frame, the CTS-self frame, and the second CF-end frame with a transmission power level that is a sum of the standard transmission power level and an amplification gain difference between the narrow bandwidth and normal bandwidth.

Specifically, during the normal bandwidth operation, in order to communicate with the destination station located in the narrow bandwidth coverage range R_nar but out of the normal bandwidth coverage range R_nor, the source station increases the transmission power level to transmit frames for notifying the narrow bandwidth operation. Therefore, the destination station located in the narrow bandwidth coverage range R_nar but out of the normal bandwidth coverage range R_nor (i.e., the stations STA3 and STA4) may hear and receive the frames from the source station.

Note that the CTS-self frame only allows the source station itself to transmit packets and frames, and prohibits the destination stations from transmitting packets and frames using the normal bandwidth, which protects the narrow bandwidth operation from interference of the destination stations using the normal bandwidth.

Figure 4:
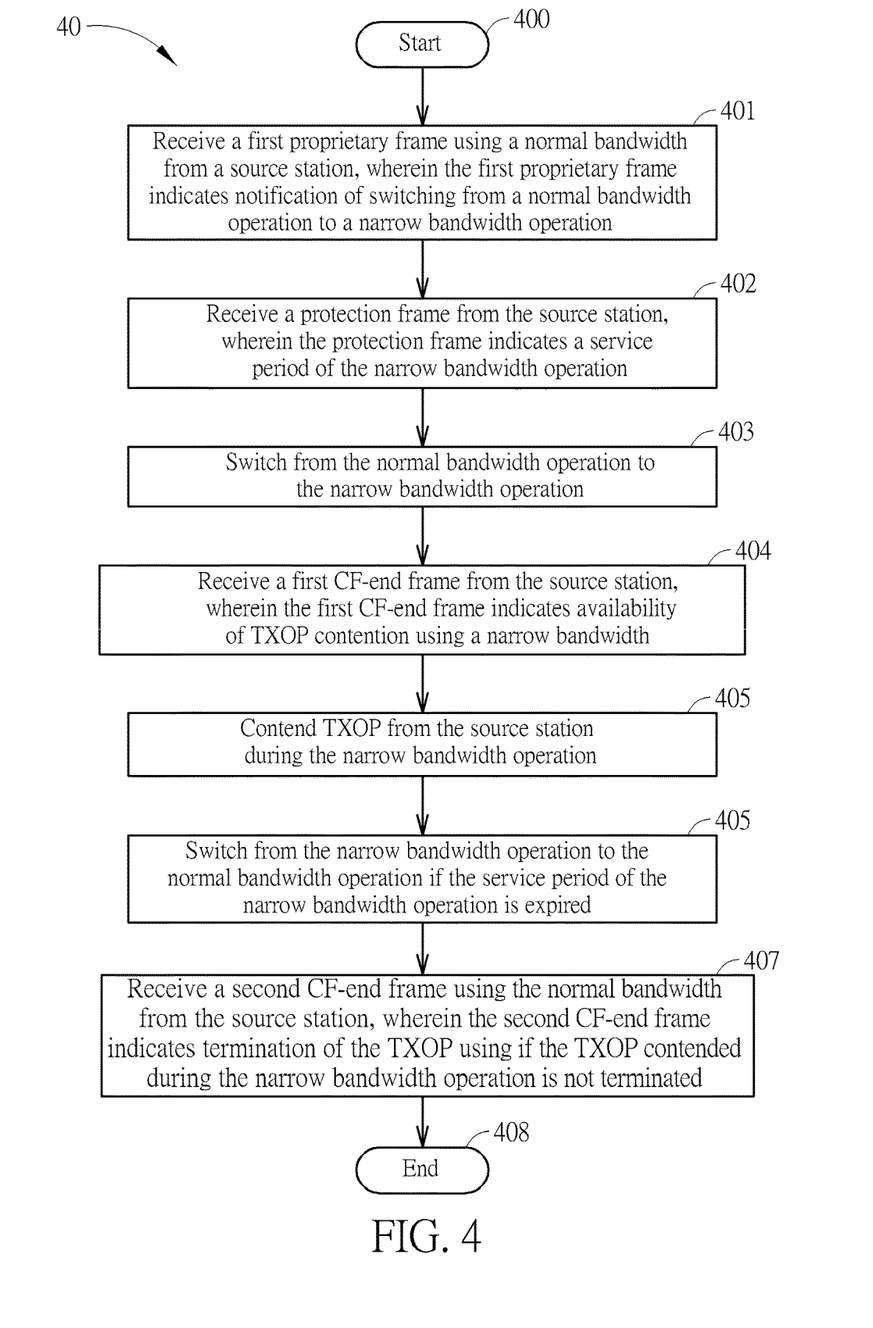
FIG. 4 is a flowchart of a process of performing normal bandwidth and narrow bandwidth coexistence operation for the destination station in the wireless communication system in FIG. 1.

FIG. 4 is a flowchart of a process 40 of performing normal bandwidth and narrow bandwidth coexistence operation for the stations STA1 and STA2 in the wireless communication system 1. The process 40 may be compiled into a program code and stored in memory devices of the stations STA1 and STA2 to be executed by wireless signal processing devices of the station STA1 and STA2. The process 40 includes the following steps.

Step 400: Start.
Step 401: Receive a first proprietary frame using a normal bandwidth from a source station, wherein the first proprietary frame indicates notification of switching from a normal bandwidth operation to a narrow bandwidth operation.
Step 402: Receive a protection frame from the source station, wherein the protection frame indicates a service period of the narrow bandwidth operation.
Step 403: Switch from the normal bandwidth operation to the narrow bandwidth operation.
Step 404: Receive a first CF-end frame from the source station, wherein the first CF-end frame indicates availability of TXOP contention using a narrow bandwidth.
Step 405: Contend TXOP from the source station during the narrow bandwidth operation.
Step 406: Switch from the narrow bandwidth operation to the normal bandwidth operation if the service period of the narrow bandwidth operation is expired.
Step 407: Receive a second CF-end frame using the normal bandwidth from the source station, wherein the second CF-end frame indicates termination of the TXOP using if the TXOP contended during the narrow bandwidth operation is not terminated.
Step 408: End.

According to the process 40, the destination station receives the first proprietary frame to acquire the incoming of switching from a normal bandwidth operation to a narrow bandwidth operation (Step 401). The destination station receives a protection frame to reserve a service period of the narrow bandwidth operation (Step 402), wherein the protection frame may be a clear-to-send to itself (CTS-self) frame or a PSMP frame for indicating the service period of the narrow bandwidth operation. Then, the destination station switches from the normal bandwidth operation to the narrow bandwidth operation (Step 403). The destination station receives a first CF-end frame from the source station, wherein the first CF-end frame indicates availability of TXOP contention using narrow bandwidth (Step 404), and contends TXOP from the source station during the narrow bandwidth operation (Step 405) to obtain uplink and downlink transmissions using the narrow bandwidth. Afterwards, the destination station switches from the narrow bandwidth operation to the normal bandwidth operation if the service period of the narrow bandwidth operation is expired (Step 406). The destination station receives a second CF-end frame using normal bandwidth from the source station, wherein the second CF-end frame indicates termination of the TXOP if the TXOP contended during the narrow bandwidth operation is not terminated (Step 407), which allows all of stations to content TXOP using normal bandwidth.

As a result, for the case of multiple solicitations, with the process 40, the destination may restore the communication with the source station through the narrow bandwidth operation when the destination station is out of the normal bandwidth coverage range.

Figure 5:
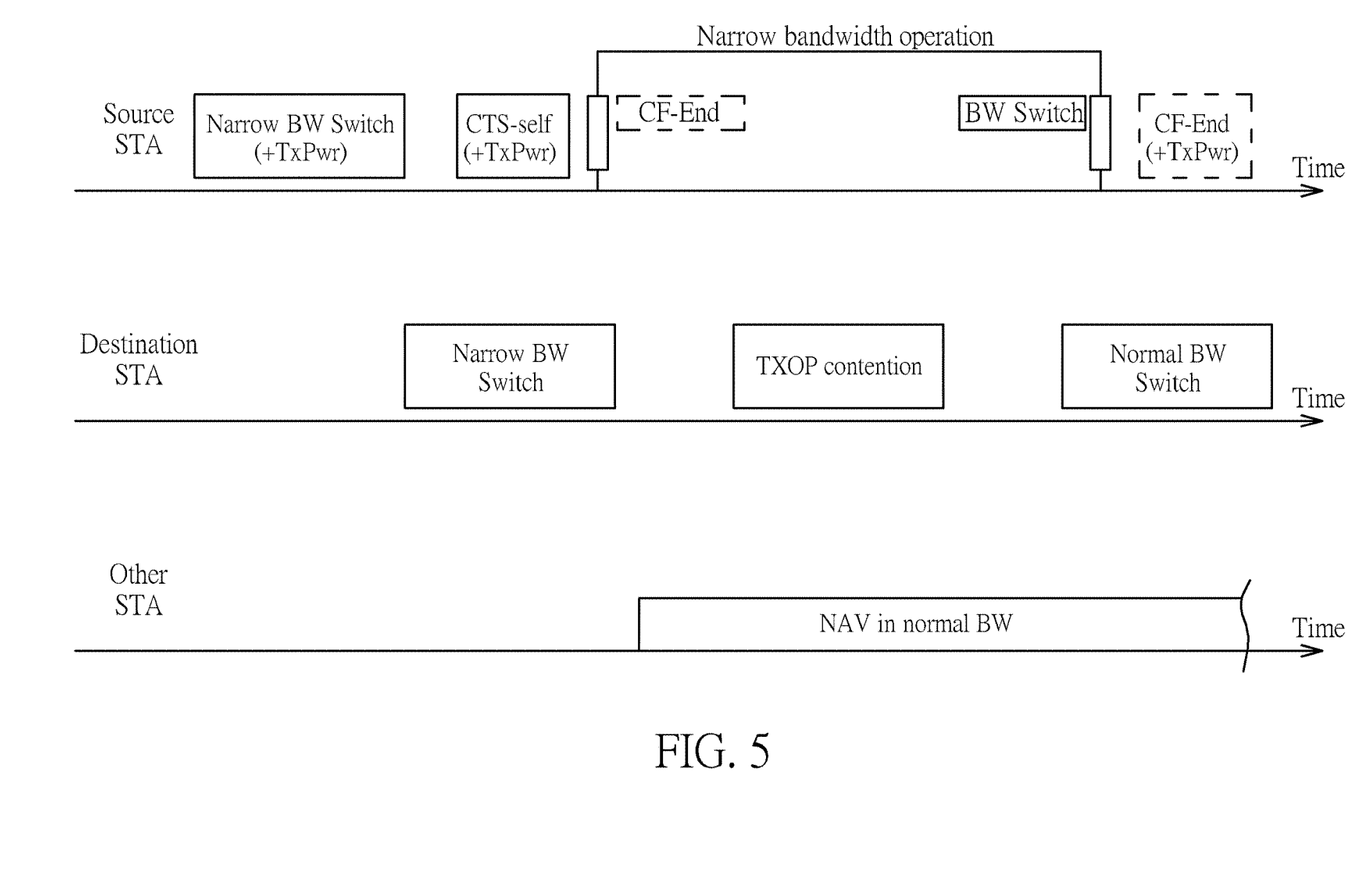
FIG. 5 illustrates a transmission time slot configured for the stations in FIG. 3 and FIG. 4 according to an embodiment of the present invention.

FIG. 5 illustrates a transmission time slot configured for the stations in FIG. 3 and FIG. 4 according to an embodiment of the present invention. The source station in FIG. 5 may be the station STA_AP in FIG. 2 which plays the role of access point, the destination station may be the station STA1 or STA2 in FIG. 2, and the other station may be the station STA3 or STA4 in FIG. 2, wherein the other station only supports normal bandwidth operation. Detailed operations of the source station may be obtained by referring to descriptions related to FIG. 3, and detailed operations of the destination may be obtained by referring to descriptions related to FIG. 4. Since the other station(s) only supports normal bandwidth operation, it is kept silence once the protection frame or the CTS-self frame is received from the source station, until the NAV timer of the protection frame or the CTS-self frame or the PSMP frame is expired.

In short, the present invention utilizes time-division mechanism that the source station uses proprietary frame for notifying incoming of the narrow bandwidth operation to the destination station in the wireless communication system, and uses protection frames to reserve the service period for the narrow bandwidth operation without the interference from the normal bandwidth operation, wherein the service period of the narrow bandwidth operation is indicated in the protection frame.

For a case of single solicitation, either the station STA_AP or one of the stations STA1-STA4 may initiate a bandwidth switch operation during the normal bandwidth operation to create or reserve a service period for narrow bandwidth operation if detecting signal strength of destination stations become weak or high packet error rate (PER), thereby restoring the communication with the destination station which supports narrow bandwidth operation. For example, the station STA_AP may initiate the bandwidth switch operation for the station STA2 out of the signal coverage ranges R_nor if detecting signal strength of station STA2 become weak or high PER; or, the station STA2 may request the station STA_AP for the bandwidth switch operation if detecting signal strength of station STA_AP become weak or high PER.

Figure 6:
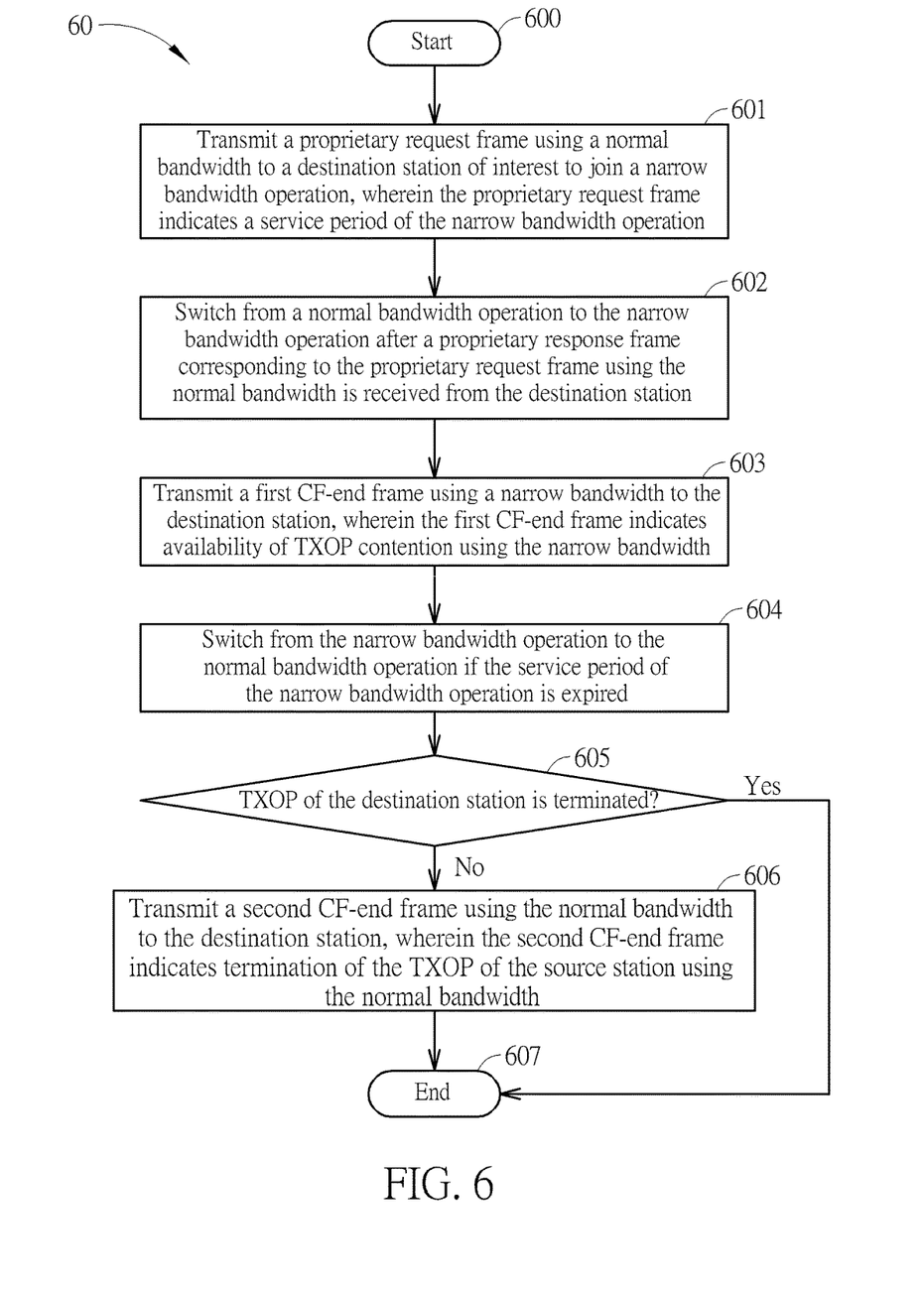
FIG. 6 is a flowchart of a process of performing normal bandwidth and narrow bandwidth coexistence operation for a source station in the wireless communication system in FIG. 1.

FIG. 6 is a flowchart of a process 60 of performing normal bandwidth and narrow bandwidth coexistence operation for a source station in a wireless communication system. In the embodiment of FIG. 6, the source station may be either the station STA_AP or the one of the stations STA1-STA2 in FIG. 2, which depends on which station is the initiator of the narrow bandwidth operation. The process 60 may be compiled into a program code and stored in a memory device of the source station to be executed by a wireless signal processing device of the source station. The process 60 includes the following steps.

Step 600: Start.
Step 601: Transmit a proprietary request frame using a normal bandwidth to a destination station of interest to join a narrow bandwidth operation, wherein the proprietary request frame indicates a service period of the narrow bandwidth operation.
Step 602: Switch from a normal bandwidth operation to the narrow bandwidth operation after a proprietary response frame corresponding to the proprietary request frame using the normal bandwidth is received from the destination station.
Step 603: Transmit a first CF-end frame using a narrow bandwidth to the destination station, wherein the first CF-end frame indicates availability of TXOP contention using the narrow bandwidth.
Step 604: Switch from the narrow bandwidth operation to the normal bandwidth operation if the service period of the narrow bandwidth operation is expired.
Step 605: Check if the TXOP of the destination station is terminated? Go to Step 607 if yes; go to Step 606 if no.
Step 606: Transmit a second CF-end frame using the normal bandwidth to the destination station, wherein the second CF-end frame indicates termination of the TXOP of the source station using the normal bandwidth.
Step 607: End.

According to the process 60, the source station transmits a proprietary request frame using normal bandwidth to a destination station of interest to join a narrow bandwidth operation, wherein the proprietary request frame indicates a service period of the narrow bandwidth operation (Step 601). The source station switches from the normal bandwidth operation to the narrow bandwidth after a proprietary response frame corresponding to the proprietary request frame using normal bandwidth is received from the destination station (Step 602), wherein the proprietary response frame may be a CTS-self frame for indicating agreement of the narrow bandwidth operation. The source station transmits a first CF-end frame using narrow bandwidth to the destination station, wherein the first CF-end frame indicates availability of TXOP contention using narrow bandwidth (Step 603). Then, the source station switches from the narrow bandwidth operation to the normal bandwidth operation (Step 604). Therefore, the destination station supporting the narrow bandwidth operation may contend TXOP to obtain uplink and downlink transmissions using the narrow bandwidth. The source station switches from the narrow bandwidth operation to the normal bandwidth operation if the service period of the narrow bandwidth operation is expired (Step 605). The source station checks whether the TXOP of the destination station during the narrow bandwidth operation is terminated or not (Step 606). If not terminated, the source station transmits a second CF-end frame using normal bandwidth to the destination station for indicating termination of the TXOP using normal bandwidth (Step 607), which allows the destination station to continue the TXOP using normal bandwidth.

As a result, for the case of single solicitation, with the process 60, the source station (either the station STA_AP or one of the stations STA1-STA4) may initiate the bandwidth switch operation during the normal bandwidth operation to create or reserve the service period for narrow bandwidth operation, thereby restoring the communication with the destination station which is out of the normal bandwidth coverage range through the narrow bandwidth operation.

In one embodiment, the proprietary request frame may be named as "narrow bandwidth switch" request frame, and transmitted by a ready-to-send (RTS) frame. The proprietary response frame may be named as "narrow bandwidth switch" response frame, and transmitted by a clear-to-send (CTS) frame. In one embodiment, the source station further transmits a proprietary frame for indicating end of the narrow bandwidth operation, before termination of the TXOP. In one embodiment, the proprietary request frame may be named as "narrow bandwidth switch-end", and transmitted by a RTS frame. In one embodiment, the service period of the narrow bandwidth operation may be indicated by an NAV timer of the proprietary request frame. In one embodiment, the source station may indicate a capability of the narrow bandwidth operation in at least one of a beacon, probe request, probe response, association request, and association response frames.

In one embodiment, for regular normal bandwidth operation, the source station transmits frames using a standard transmission power level. In preparation of the narrow bandwidth operation, the source station increases its transmission power level to transmit the proprietary request frame and the second CF-end frame with a transmission power level that is a sum of the standard transmission power level and an amplification gain difference between the narrow bandwidth and normal bandwidth.

Figure 7:
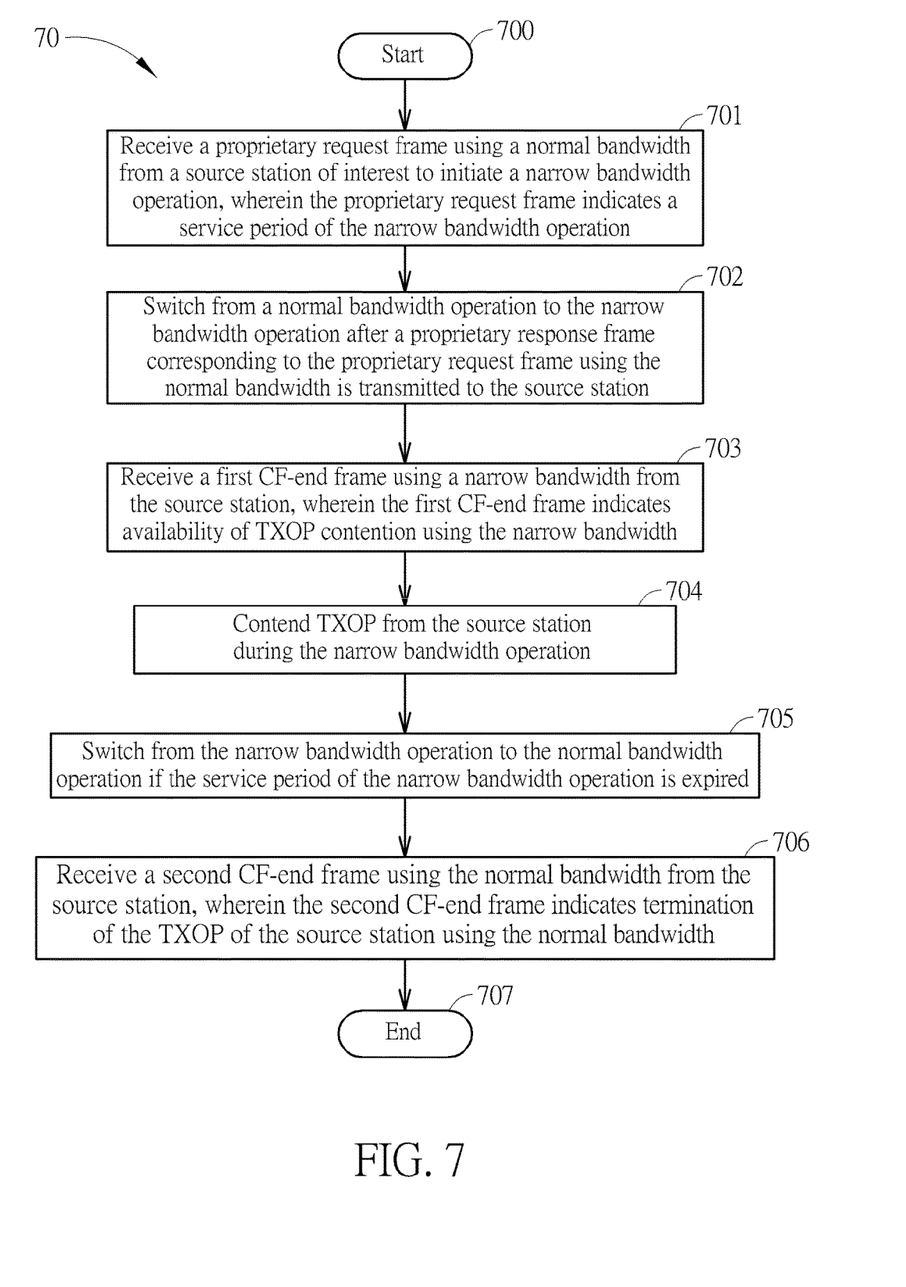
FIG. 7 is a flowchart of a process of performing normal bandwidth and narrow bandwidth coexistence operation for a destination station in the wireless communication system in FIG. 1.

FIG. 7 is a flowchart of a process 70 of performing normal bandwidth and narrow bandwidth coexistence operation for a destination station in a wireless communication system. In the embodiment of FIG. 7, the source destination station may be either the station STA_AP or the one of the stations STA1-STA2 in FIG. 2, which depends on which station is the joiner of the of the narrow bandwidth operation. The process 70 may be compiled into a program code and stored in a memory device of the destination station to be executed by a wireless signal processing device of the destination station. The process 70 includes the following steps.

Step 700: Start.
Step 701: Receive a proprietary request frame using a normal bandwidth from a source station of interest to initiate a narrow bandwidth operation, wherein the proprietary request frame indicates a service period of the narrow bandwidth operation.
Step 702: Switch from a normal bandwidth operation to the narrow bandwidth operation after a proprietary response frame corresponding to the proprietary request frame using the normal bandwidth is transmitted to the source station.
Step 703: Receive a first CF-end frame using a narrow bandwidth from the source station, wherein the first CF-end frame indicates availability of TXOP contention using the narrow bandwidth.
Step 704: Contend TXOP from the source station during the narrow bandwidth operation.
Step 705: Switch from the narrow bandwidth operation to the normal bandwidth operation if the service period of the narrow bandwidth operation is expired.
Step 706: Receive a second CF-end frame using the normal bandwidth from the source station, wherein the second CF-end frame indicates termination of the TXOP of the source station using the normal bandwidth.
Step 707: End.

According to the process 70, the destination station receives the proprietary request frame to determine whether to join a narrow bandwidth operation (Step 701), wherein the proprietary frame indicates a service period of the narrow bandwidth operation. The destination station switches from a normal bandwidth operation to the narrow bandwidth after a proprietary response frame corresponding to the proprietary request frame using normal bandwidth is transmitted to the source station (Step 702). The destination station receives a first CF-end frame from the source station, wherein the first CF-end frame indicates availability of TXOP contention using narrow bandwidth (Step 703), and contends TXOP from the source station during the narrow bandwidth operation (Step 704) to obtain uplink and downlink transmissions using the narrow bandwidth. Afterwards, the destination station switches from the narrow bandwidth operation to the normal bandwidth operation if the service period of the narrow bandwidth operation is expired (Step 705). The destination station receives a second CF-end frame using normal bandwidth from the destination station, wherein the second CF-end frame indicates termination of the TXOP of the source station using normal bandwidth (Step 706), which allows all of stations to content TXOP using normal bandwidth.

As a result, for the case of single solicitation, with the process 70, the destination may join the narrow bandwidth operation, thereby restoring the communication with the source station when the destination station is out of the normal bandwidth coverage range.

Figure 8:
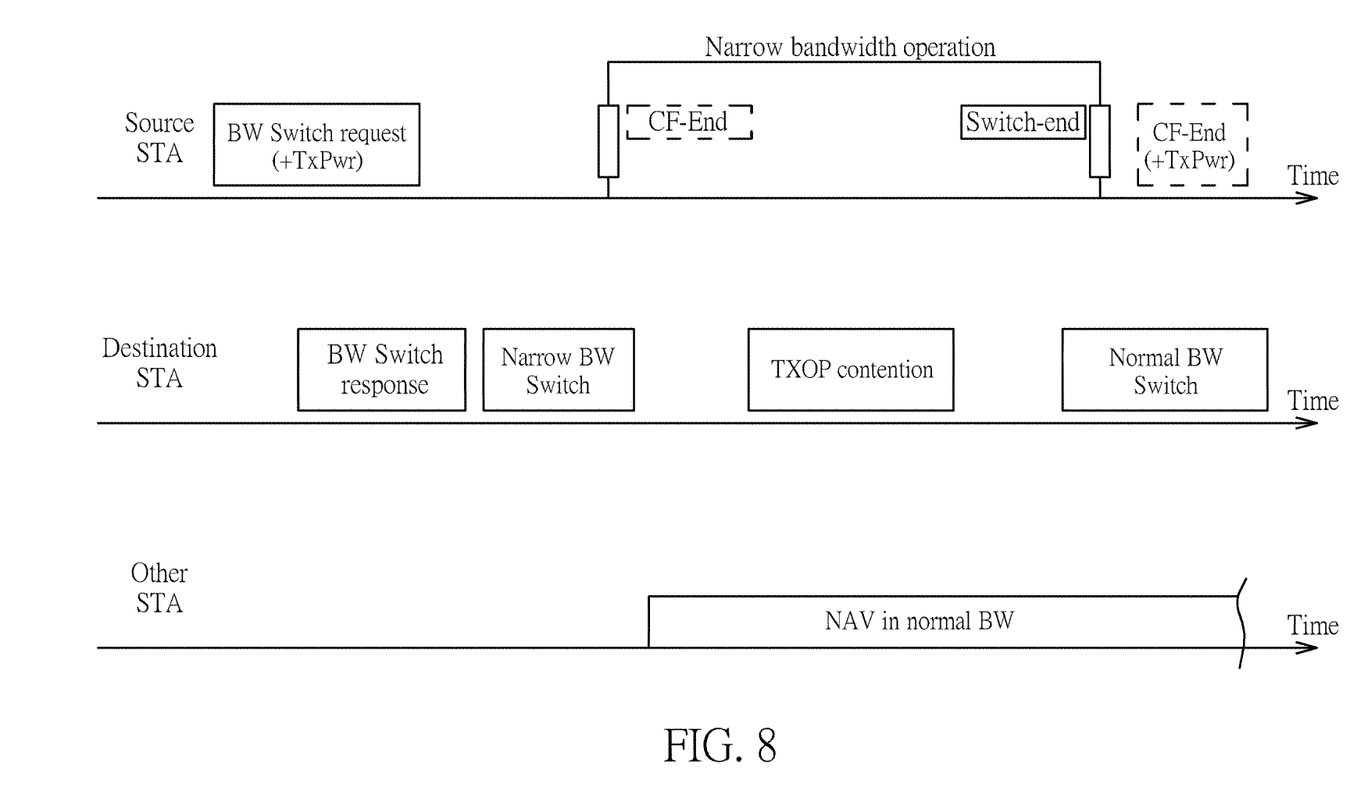
FIG. 8 illustrates a transmission time slot configured for the stations in FIG. 6 and FIG. 7 according to an embodiment of the present invention.

FIG. 8 illustrates a transmission time slot configured for the stations in FIG. 6 and FIG. 7 according to an embodiment of the present invention. The source station in FIG. 8 may be either the station STA_AP or one of the stations STA1-STA2 in FIG. 2, which plays the role of the narrow bandwidth operation initiator. The destination station may be either one of the stations STA1-STA2 or the station STA_AP in FIG. 2, which plays the role of the narrow bandwidth operation joiner. The other station may be the station STA3 or STA4 in FIG. 2, wherein the other station only supports normal bandwidth operation. Detailed operations of the source station may be obtained by referring to descriptions related to FIG. 6, and detailed operations of the destination may be obtained by referring to descriptions related to FIG. 7. Since the other station(s) only supports normal bandwidth operation, it is kept silence once the protection frame or the CTS-self frame proprietary request frame is received from the source station, until the NAV timer of the proprietary request frame is expired.

To sum up, the present invention utilizes time-division mechanism that the source station uses proprietary frame for notifying incoming of the narrow bandwidth operation to the destination station in the wireless communication system, and uses protection frames to reserve the service period for the narrow bandwidth operation without the interference from the normal bandwidth operation, wherein the service period of the narrow bandwidth operation is indicated in the protection frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling coexistence of different bandwidth operations for a source station in a wireless communication system, comprising:
   transmitting a first proprietary frame using a normal bandwidth to at least one destination station in the wireless communication system, wherein the first proprietary frame indicates notification of switching from a normal bandwidth operation to a narrow bandwidth operation; and
   transmitting a protection frame using the normal bandwidth to the at least one destination station, wherein the protection frame indicates a service period of the narrow bandwidth operation;
   wherein the first proprietary frame is transmitted with a transmission power level that is a sum of a standard transmission power level of the normal bandwidth operation and an amplification gain difference between the narrow bandwidth and normal bandwidth.

2. The method of claim 1, further comprising:
   switching from the normal bandwidth operation to the narrow bandwidth operation after the protection frame is transmitted;
   transmitting a first contention-free end (CF-end) frame using a narrow bandwidth to the at least one destination station, wherein the first CF-end frame indicates availability of transmit opportunity (TXOP) contention using the narrow bandwidth; and
   switching from the narrow bandwidth operation to the normal bandwidth operation when the service period of the narrow bandwidth operation is expired.

3. The method of claim 1, further comprising:
   checking whether at least one transmit opportunity (TXOP) of the at least one destination station is terminated; and
   transmitting a second contention-free end (CF-end) frame using the normal bandwidth to the at least one destination station when the at least one TXOP of the at least one destination station is not terminated;
   wherein the second CF-end frame indicates termination of the at least one TXOP of the at least one destination source station using the normal bandwidth, and is transmitted by the source station with a transmission power level that is a sum of a standard transmission power level of the normal bandwidth operation and an amplification gain difference between the narrow bandwidth and normal bandwidth.

4. The method of claim 1, wherein the protection frame is a clear-to-send to itself (CTS-self) frame or a Power save multi-poll (PSMP) frame.

5. The method of claim 4, wherein the service period of the narrow bandwidth operation is indicated by a Network Allocation Vector (NAV) timer of the CTS-self frame, and the CTS-self frame is transmitted with a transmission power level that is a sum of a standard transmission power level of the normal bandwidth operation and an amplification gain difference between the narrow bandwidth and normal bandwidth.

6. The method of claim 1, wherein the source station indicates a capability of the narrow bandwidth operation to the at least one destination station in at least one of a beacon, probe request, probe response, association request, and association response frames.

7. The method of claim 1, wherein the source station is a wireless access point and the destination station is a user equipment.

8. A method of handling coexistence of different bandwidth operations for a source station in a wireless communication system, comprising:
    transmitting a proprietary request frame using a normal bandwidth to a destination station of interest to join a narrow bandwidth operation, wherein the proprietary request frame indicates a service period of the narrow bandwidth operation;
    switching from a normal bandwidth operation to the narrow bandwidth operation after a proprietary response frame corresponding to the proprietary request frame using the normal bandwidth is received from the destination station;
    transmitting a proprietary frame for indicating end of the narrow bandwidth operation before termination of a transmit opportunity (TXOP) of the source station;
    checking whether a TXOP of the destination station during the narrow bandwidth operation is terminated; and
    transmitting a second contention-free end (CF-end) frame using the normal bandwidth to the destination station when the TXOP of the source station during the narrow bandwidth operation is not terminated, wherein the second CF-end frame indicates termination of the TXOP of the source station using the normal bandwidth, and transmitted by the source station with a transmission power level that is a sum of a standard transmission power level of the normal bandwidth operation and an amplification gain difference between the narrow bandwidth and normal bandwidth.

9. The method of claim 8, further comprising:
    transmitting a first contention-free end (CF-end) frame using a narrow bandwidth to the destination station, wherein the first CF-end frame indicates availability of transmit opportunity (TXOP) contention using the narrow bandwidth; and
    switching from the narrow bandwidth operation to the normal bandwidth operation when the service period of the narrow bandwidth operation is expired.

10. The method of claim 8, wherein the proprietary response frame is transmitted as a clear-to-send (CTS) frame.

11. The method of claim 8, wherein the service period of the narrow bandwidth operation is indicated by a Network Allocation Vector (NAV) timer of the proprietary request frame.

12. The method of claim 8, wherein the source station indicates a capability of the narrow bandwidth operation to the destination station in at least one of a beacon, probe request, probe response, association request, and association response frames.

* * * * *